United States Patent [19]

Liebergot et al.

[11] 4,233,682
[45] Nov. 11, 1980

[54] FAULT DETECTION AND ISOLATION SYSTEM

[75] Inventors: Harris L. Liebergot, Lafayette Hill; Richard M. Sedmak, Schwenksville, both of Pa.

[73] Assignee: Sperry Corporation, New York, N.Y.

[21] Appl. No.: 915,838

[22] Filed: Jun. 15, 1978

[51] Int. Cl.³ .............................................. G06F 11/16
[52] U.S. Cl. ..................................... 371/68; 307/219
[58] Field of Search .............................. 235/307, 302; 340/146.1 BE; 307/204, 219; 364/200, 900, 741; 371/68

[56] References Cited

U.S. PATENT DOCUMENTS

| | | | |
|---|---|---|---|
| 3,051,387 | 8/1962 | Pomerene et al. | 364/741 |
| 3,509,532 | 4/1970 | Vande Wege | 340/146.1 BE |
| 3,517,174 | 6/1970 | Ossfeldt | 235/307 |
| 3,646,516 | 2/1972 | Flinders et al. | 340/146.1 BE |
| 3,751,685 | 8/1973 | Jaeger | 307/219 |
| 3,770,948 | 11/1973 | Caputo et al. | 235/307 |
| 3,803,568 | 4/1974 | Higashide | 235/304 |
| 4,020,460 | 4/1977 | Jones et al. | 340/146.1 BE |

OTHER PUBLICATIONS

Sellers et al., Error Detecting Logic and Digital Computers, McGraw-Hill Co., 1968, pp. 207-211.
Geng et al., Circuit for the Complete Check of a Data-Processing System, IBM Tech. Discl. Bulletin, vol. 16, No. 4, Sep. 1973, pp. 1144-1145.

Primary Examiner—Charles E. Atkinson
Attorney, Agent, or Firm—Walter B. Udell; Thomas J. Scott; William E. Cleaver

[57] ABSTRACT

The invention provides data processing duplication and internal error checking within an integrated circuit chip at intermediate points along the logic chain. In one aspect of the invention, duplicate functional logic within the chip is utilized together with multiple fault detectors to provide error checking of the primary logic chain, mechanical interconnection failures, and power and clock pulse checking. The detectable failures are both transient and hard failures. Other problems are in addition resolvable by utilization of duplicate complementary logic in place of duplicate functional logic, such other problems including chip contamination during manufacture, mask problems and functional design problems. The multiple fault detectors provide a multiplicity of error signals which are multiplexed within the chip to produce encoded output error signals each of which designates the fault which has been detected within the chip. These encoded error signals are routed to a special error handling chip which receives encoded error signals from a large number of places, such as a group of chips or circuit cards, and by correlating the information contained in the encoded error signals is able to identify the source of the error as a particular VLSI chip, the interconnections between VLSI chips, a particular circuit card, a power supply line to a circuit card or a group of such cards, or other faults.

14 Claims, 7 Drawing Figures

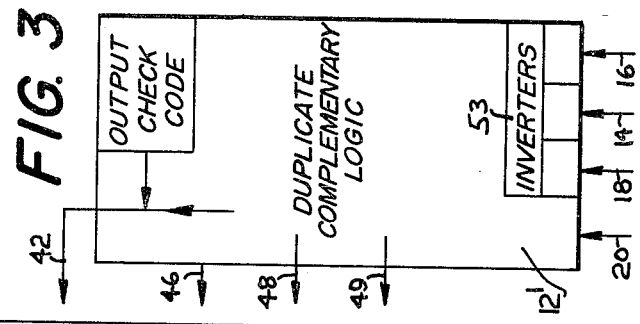
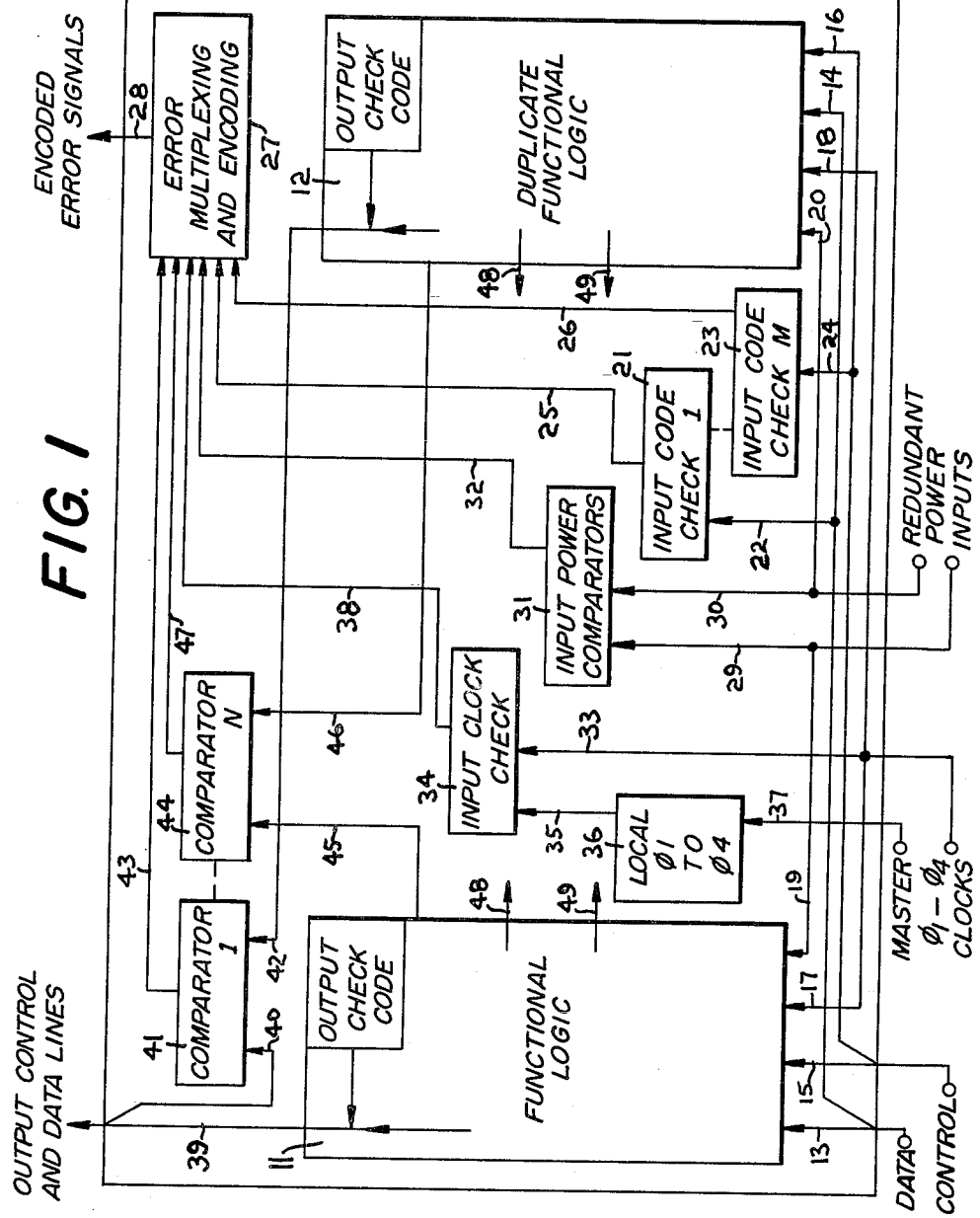

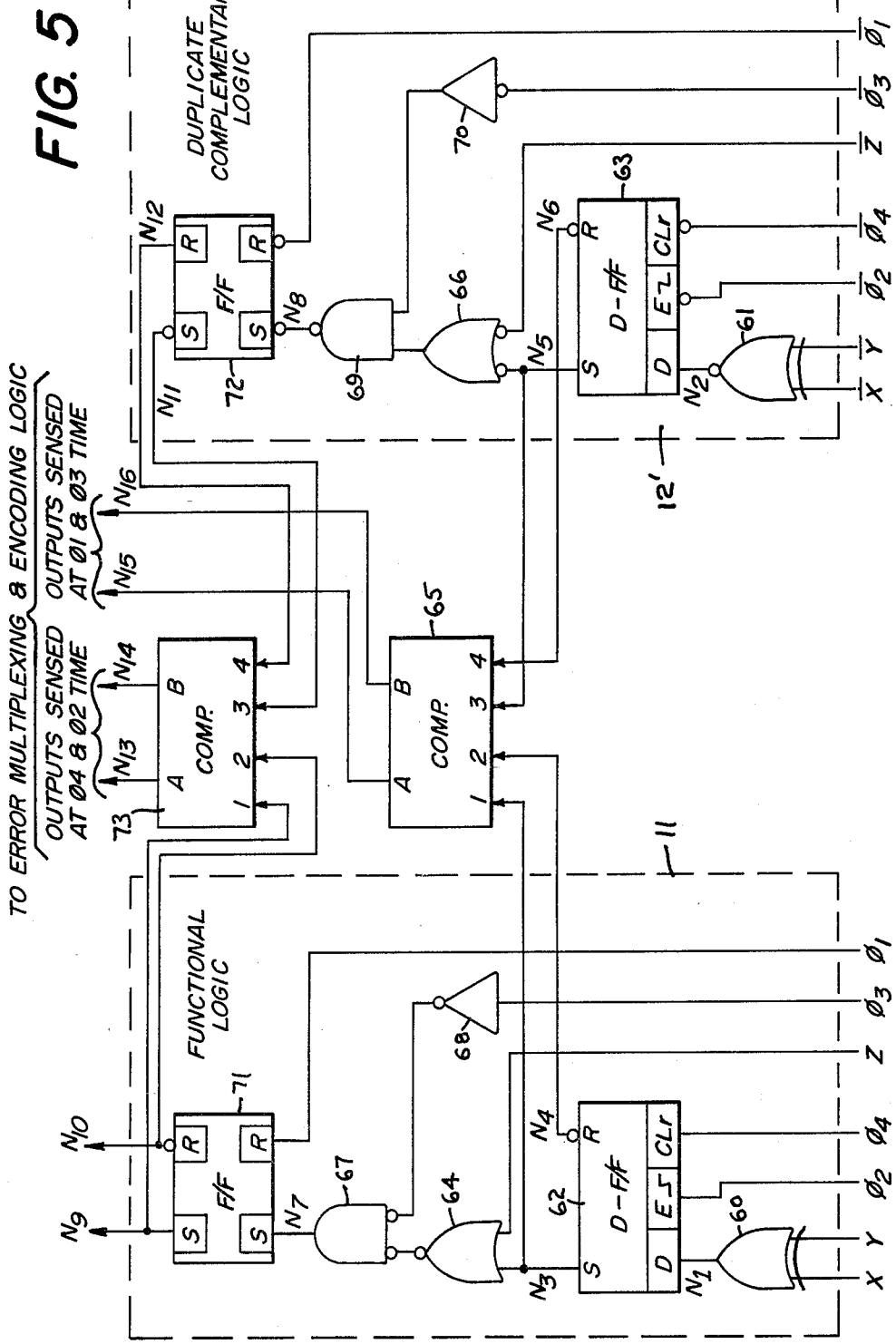

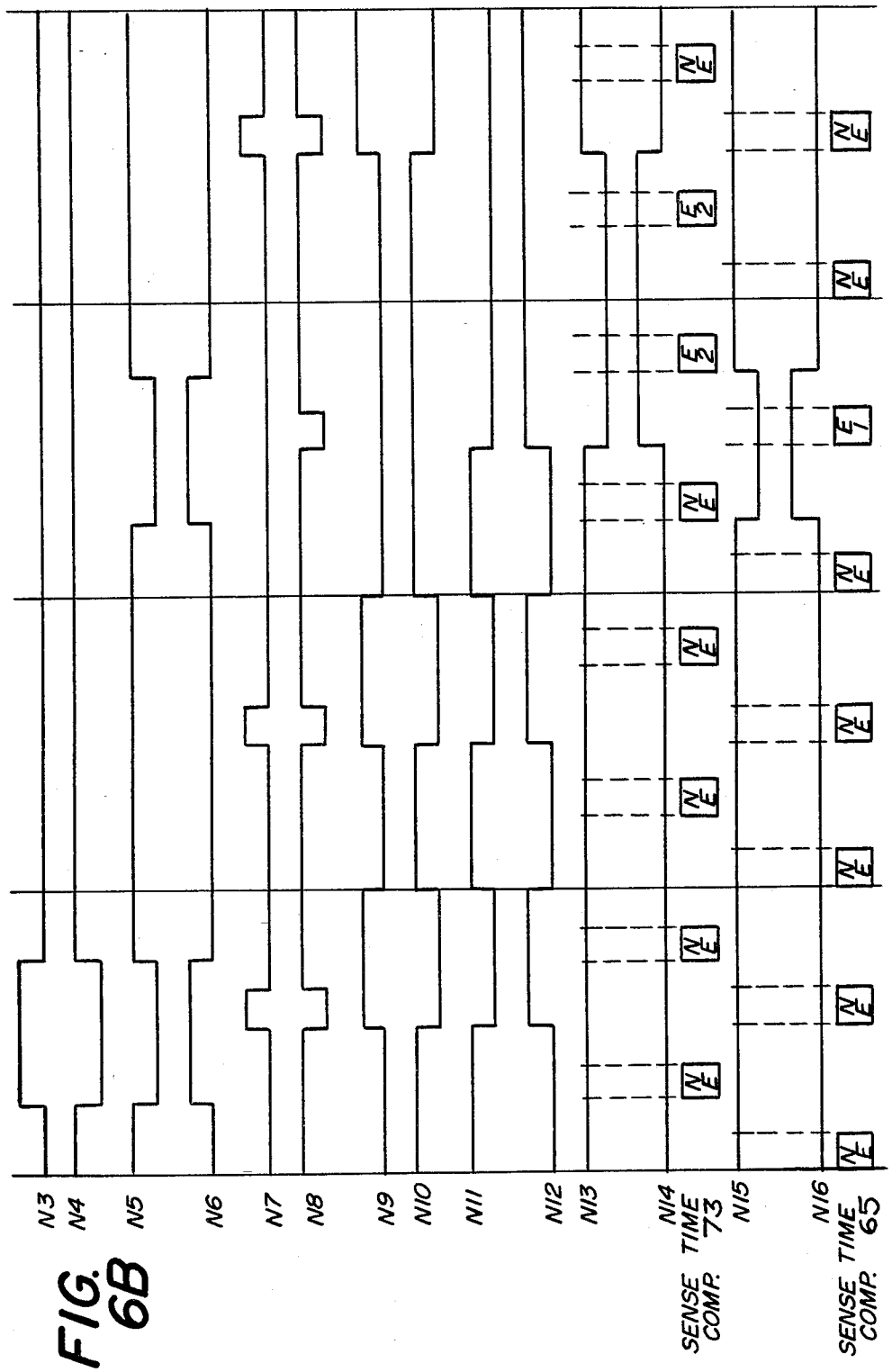

FAULT DETECTION AND ISOLATION SYSTEM

This invention relates generally to error detection systems, and more particularly relates to error detecting in computer systems in which errors heretofore not successfully dealt with are detectable with a high degree of accuracy which permits rapid diagnosis of the source of the error as a solid failure of the equipment or as a transient error, and in the latter case permits error recovery to be carried out and does not result in system shutdown. Solid failures are identified with a higher degree of precision than heretofore possible so that trouble shooting diagnosis and maintenance times are substantially reduced.

Computer systems have progressed in stages first from circuits made up individually of discrete circuit elements, then to circuits made up of discrete basic logic structures such as gates and registers discretely interconnected by wiring techniques, and then to higher density circuits utilizing integrated circuit packages. Malfunctions in finished equipment arise from several areas, one area being defects in the individual components which make up the circuits, a second area being improper wiring or interconnection of the components, and the third area being failures which result in the components or wiring subsequent to manufacture of the finished assembly.

The testing of the components which go into the circuitry was a relatively simple matter with discrete items such as transistors and prepackaged counters and flip-flops. However, with the advent of integrated circuit packages containing quite a number of circuit components, as the density increased, the difficulty and expense of testing increased drastically until at the present time the cost of testing of a large scale integrated circuit package (LSI) by the manufacturer can exceed the cost of manufacture by a substantial margin. Equipment for testing some presently available integrated circuit packages costs in the range of from one-half million to a million and one-half dollars, and at the same time is generally incapable of adequately testing all possible functional uses of such integrated circuit packages. Accordingly, components which appear to test properly can in fact fail in a particular application.

With the advent of very large scale integrated circuits (VLSI) containing in excess of five thousand gates per chip, perhaps as many as fifteen thousand gates per chip, the testing problem becomes somewhat unmanageable. Processing errors which occur during the processing of data through the circuitry of such a chip are not normally detectable until the data has been processed through the chip and the results examined at the output. The length of time involved in such a long processing chain is such that if an error is detected, it is not possible to interrupt the processing and try a procedure to recover the error and proceed with the processing. In general, it will be necessary to progressively degrade the system capability until the error generation problem has been resolved.

With VLSI circuits the logic density per chip is so high that access to all of the logic is severely limited by the availability of pin connections to the chip. For example, a ten thousand gate VLSI may have 130 input-output pins. This makes it possible to utilize some of the logic capacity to provide processing duplication and error checking comparisons inside of the chip at intermediate processing points along the logic chain so that the occurrence of errors can be detected not only earlier than at the output but also at multiple points along the logic chain to pinpoint precisely what has gone wrong closer to the time of failure.

The basic concept of the present invention is the provision of data processing duplication and error checking within an integrated circuit chip at intermediate points along the logic chain. In one aspect of the invention, duplicate functional logic within the chip is utilized together with multiple comparators to provide error checking of the primary logic chain, mechanical interconnection failures, and power and clock pulse checking. The detectable failures are both transient and hard failures. This concept, while a great improvement over present techniques, is not capable of detecting certain problems which arise, and these problems are resolvable by utilization of duplicate complementary logic in place of the duplicate functional logic just previously mentioned. The use of duplicate complementary logic provides the ability to detect and identify error generation due to chip contamination during manufacture, mask problems and functional design problems.

The use of multiple fault detectors provides a multiplicity of error signals which are multiplexed within the chip to produce encoded output error signals each of which designates the fault which has been detected within the chip. These encoded error signals can then be routed to special error handling chips which receive encoded error signals from a large number of places, such as a group of chips or circuit cards, and by correlating the information contained in the encoded error signals are able to identify the source of the error. Such sources might be identifiable as a particular VLSI chip, the interconnections between VLSI chips, a particular circuit card, a power supply line to a circuit card or a group of such cards, or other faults. Consequently, trouble shooting diagnosis of machine malfunctions is greatly simplified and maintenance time reduced. Accordingly, it is a primary object of the invention to provide a novel system of error checking in devices using very large scale integrated circuit packages by utilizing integrated circuit chips structured to incorporate integrally therewithin error checking circuits.

Another object of the invention is to provide a novel error checking system as aforesaid in which error checking is carried out internally within a VLSI chip at least at one intermediate point along the logic chain, and preferably at a plurality of intermediate points along the logic chain.

A further object of the invention is to provide a novel error checking system as aforesaid in which duplicate functional logic within the chip is utilized together with multiple comparators to provide error checking of the primary logic chain, the power supplies and clock pulse sources.

A further object of the invention is to provide a novel error checking system as aforesaid in which duplicate complementary logic is utilized in place of the duplicate functional logic to thereby detect errors not identifiable with the use of duplicate functional logic.

Another object of the invention is to provide a novel error checking system in which separately encoded error signals are generated within a VLSI chip, which encoded error signals are utilized to identify with a high degree of particularity the source of the particular errors which have been registered.

The foregoing and other objects of the invention will become clear from a reading of the following specification in conjunction with an examination of the appended drawings, wherein:

FIG. 1 is a functional block diagram of a VLSI chip constructed according to the invention and utilizing duplicate functional logic;

FIG. 3 represents a change in the configuration of the VLSI chip of FIG. 1 to substitute duplicate complementary logic for the duplicate functional logic shown in FIG. 1;

FIG. 5 is a logic diagram illustrating one possible portion of a logic chain of a VLSI chip of the kind represented by FIG. 3;

In the several figures, like elements are denoted by like reference characters.

Figure 4:
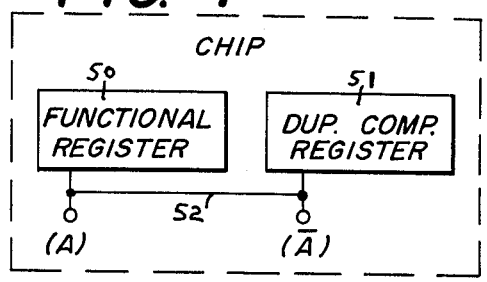
FIG. 4 illustrates a type of contamination which can occur during the manufacture of integrated circuit chips and which will be detected by the system according to the invention.

Considering first FIG. 1 there is seen a VLSI chip designated generally as 10 within which is a functional logic chain designated generally as 11 and a duplicate functional logic chain designated as 12. Data input to the logic chains 11 and 12 is carried respectively over conductor sets 13 and 14, control signals are routed to the logic chains 11 and 12 respectively over conductor sets 15 and 16, and $\phi 1$ through $\phi 4$ clock pulses are routed to the functional logic 11 and 12 over two sets of four input lines designated respectively as line sets 17 and 18. Power from a common power supply is brought to the VLSI chip 10 over separate wiring runs. One of these power circuits is routed to logic chain 11 via conductor set 19 while power to logic chain 12 is received over conductor set 20.

The incoming data is also routed to a fault detector 21 via conductor set 22, and the control signals are routed to a fault detector 23 via conductor set 24. The fault detectors 21 and 23 respectively check that the data and control signals are correct by utilizing error correction code (ECC) or parity check. If the fault detectors 21 or 23 detect an error, they send signals over conductor sets 25 and 26 respectively to an error multiplexing and encoding circuit 27 which generates an output signal on conductor set 28 in encoded form designating the nature of the error which has been detected within the chip 10. The redundant power inputs on conductor sets 19 and 20 are also separately routed via conductor sets 29 and 30 to an input power comparator 31, which, upon detection of loss of power on either of the input conductor sets generates an error signal which is routed over conductor set 32 to the error encoding circuit 27. A typical error encoding circuit could for example use a function table or other well known coding means. An illustration of a function table is shown in U.S. Pat. No. 3,196,402 assigned to the assignee of the present invention.

FIG. 1 is shown as having four clock pulse phase inputs, $\phi 1$ through $\phi 4$ although it is to be understood that the choice of four clock pulse phases is only illustrative. The four clock pulse phases are routed over a group of individual conductors designated as 33 for the entire group as one input to a clock pulse fault detector 34. Another set of conductors 35 carries locally generated clock pulses $\phi 1$ through $\phi 4$ to clock pulse fault detector 34 from a local clock pulse generator 36 which generates the clock pulse phases under control of a master clock pulse, which latter is externally generated and brought into the chip via conductor 37. Should a failure appear on one of the incoming clock pulse lines 33 or should the local clock pulse generator 36 fail to generate one or more clock pulse phases, the clock pulse fault detector 34 will generate an error signal which is routed via conductor set 38 for encoding by the error encoding circuit 27.

The output of the functional logic chain 11 after having an output check code added to it is routed out of the chip over output conductor set 39, and is also routed via conductor set 40 to one set of inputs to comparator 41, the other set of inputs to comparator 41 coming over conductor set 42 from the output of the duplicate functional logic chain 12. Should there be either a miscompare of the data presented to the comparator 41 or a failure of the comparator itself, an error signal is sent over conductor set 43 to the error encoding circuit 27. A similar arrangement is shown for an intermediate processing point along the logic chain in connection with the comparator 44 which receives inputs for comparison via conductor set 45 from the functional logic chain 11 and via conductor set 46 from the duplicate functional logic chain 12. A miscompare results in an error signal being sent over conductor set 47 to the error encoding circuit 27.

The comparators 41 and 44 are designated as comparator 1 and comparator N respectively with a dotted line between the two to indicate the presence of an indeterminate number of additional comparators of the same kind. These additional comparators are used to make comparisons at other points along the logic chain, as for example a comparison could be made with data extracted from the logic chains 11 and 12 at an earlier intermediate point designated respectively by the two arrows 48, or at a yet earlier intermediate processing point designated by the two arrows 49. Any desired number of such intermediate points may be designed into the chip, each such pair of points being associated with a particular comparator, the outputs of which comparators are all routed to the error encoding circuit 27.

The use of redundant power input circuits 29 and 30 to the chip 10, in which each such circuit is fed from separate power line carried back to the common power supply for the apparatus, permits isolation of a power failure fault with a great deal of precision. For example, the power supply output itself is normally monitored to determine whether a failure of the entire supply occurred so that a failure of that type would normally be identified. However, assuming that no such failure of the main power supply is indicated, but a power supply failure at a particular chip is indicated by the generation of an error signal so designating, it is possible to determine whether the failure is in that chip or in the distribution net to the chip by checking to see whether or not any other chip supplied by that same power conductor, probably one on the same circuit card, has also generated a power supply error signal. If only one such chip is generating the power supply error signal then it is fairly certain that the fault is in the chip or the pin connections thereto, whereas, if all of the chips fed from the same wiring run show error conditions then it is fairly certain that there has been a failure in the distribution net and not in the chips.

If different circuit cards along the power conductor run show different conditions, namely a situation in which the chips of one card are generating power error signals while the chips of another card on the same run are not generating such error signals, then it is establishable that a break in the power net occurred at a point between those two circuit cards. Determinations of this nature are made by the processing capability of an error handling chip such as that shown in functional block form in the showing of FIG. 2 to be subsequently described.

The general scheme of handling the error signals in the case of an apparatus utilizing a number of circuit cards each of which carries a plurality of VLSI chips would be to route the encoded output signals from the error multiplexing and encoding circuit 27 of each chip via its output lines 28 to an error handling chip which monitored all of the chips in order to make error function decisions determining whether errors appeared to be originating from a particular chip or from something common to many chips. All of the signals from the error handling chips would then be routed to system or sub-system error handling chips which could then make determinations with respect to the distribution net.

The end result of the error signals analysis can be used to provide an output display of failure isolation, and, in appropriate cases halt further processing and initiate a retry procedure to attempt to obtain error recovery. If the detected error were of a transient nature it is likely that the retry process would recover the error, and the entire processing could then be reinitiated and continued. If a hard failure is established, then processing would be terminated until repair had been effected.

The illustrated system of bringing into each chip both the master clock pulses and the separate phase clock pulses permits the detection of a faulty oscillator, missing single or multiple phases, extreme out of tolerance phases, and out of sequence phases. By monitoring all of the VLSI chips for clock fault errors, the error handling chip system permits isolation of the failure detected to either the clock pulse generator, or to the distribution net and pins, or to the receiving chip.

Figure 2:
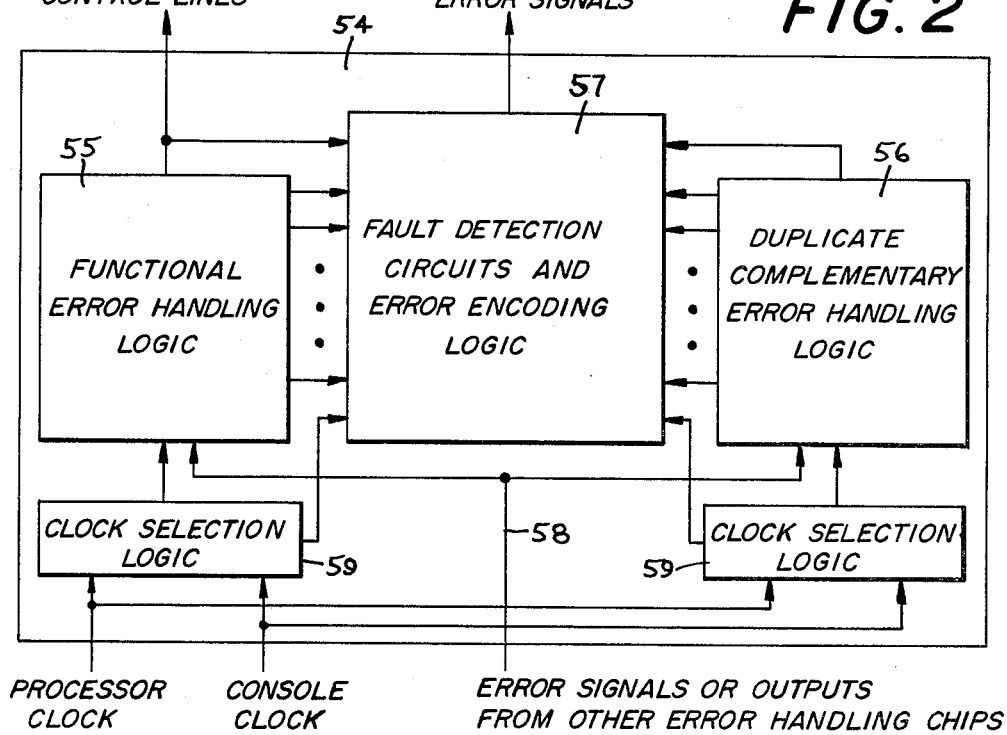
FIG. 2 is a functional block diagram of an error handling chip utilized to process encoded error signals from VLSI chips as illustrated in FIGS. 1 and 3.
Figure 6A:
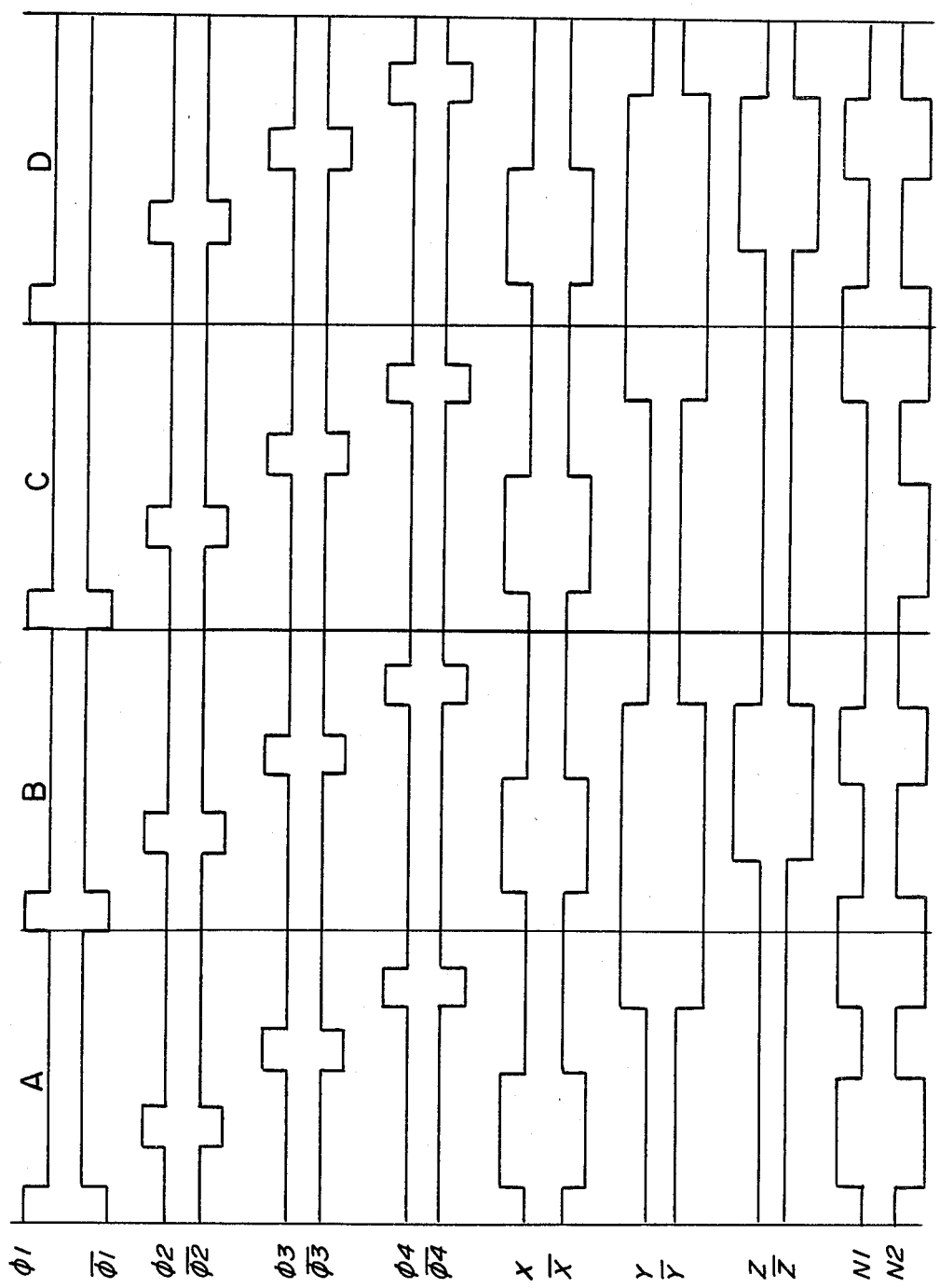

FIG. 2 illustrates a form of error handling chip 54 which is observed to contain a functional error handling logic chain 55, a duplicate complementary error handling logic chain 56, and fault detection circuits and error encoding logic block 57 which latter corresponds to the various fault detectors shown in FIG. 1 together with an equivalent of the error encoding logic 27 of FIG. 1. The data input to the chip in this case is the error signals from other error handling chips, or the error signals from the error encoding circuits of a plurality of chips, these signals being inserted into the chip circuitry through the group of conductors 58. Also as shown in FIG. 2 are clock selection logic circuits 59 which select the clock which is controlling the processing through the error handling chip. Such a system is utilizable where a console is used to display the detected error conditions, and it is not desired to lose that error display if the central processor clock should fail. In such an event, the console clock allows the error processing to continue through the error handling chip so that the error data is not lost but is presented to the console for read-out.

While the error checking system as just described in connection with the showing of FIG. 1 represents a substantial advance over the art, nevertheless there are certain types of errors which can occur within the functional logic chain which would go undetected. These problems are problems associated with an error in the mask from which a portion of the functional logic is formed, contamination problems within the chip which occur during manufacture, and functional design problems such as timing problems which are known as "race" conditions, and are capable of being resolved by employing duplicate complementary logic instead of duplicate functional logic.

FIG. 3 illustrates the change in the VLSI chip 10 of FIG. 1 in order to implement the error detection advantages of utilizing duplicate complementary logic instead of duplicate functional logic. The duplicate functional logic chain 12 of FIG. 1 is replaced by the duplicate complementary logic chain 12' of FIG. 3. The output connections to conductor sets 42, 46 48 and 49 are identically the same as those connections for the duplicate functional chain 12, and similarly, the input connection conductor sets 14, 16, 18 and 20 are the same. However, the data signals, control signals and clock pulse phase signals present on conductor sets 14, 16 and 18 are passed through a set of inverters 53 before being passed into the duplicate complementary logic chain. This is necessary so that the signals into the duplicate complementary logic chain are the complements of the signals which are presented to the functional logic chain 11.

The mask problem is one which arises during the manufacturing process of an integrated circuit chip in that the mask which is used to produce the functional logic in the chain 11 of FIG. 1 could contain flaws such as a missing contact or a misplaced gate or resistor, and if logic chain 12 is to be a duplicate of the functional logic of chain 11, then the same mask would be used to produce chain 12 in the equivalent region to chain 11. Consequently, the same error would appear in the duplicate functional logic chain as appears in the original functional logic chain, and the probability is that it would not be detected. This will cause operational errors when the chip is incorporated into equipment, and there is a high likelihood that the comparators monitoring the logic chains will not detect these errors. The errors will be detected at some subsequent stage down the line, but the source of the error is then buried someplace in the equipment and is very difficult to locate.

If however, instead of using duplicate functional logic in the logic chain 12, duplicate complementary logic is utilized, then the same mask cannot be used to produce that logic, and it is highly unlikely that a complementary error would be built into the new mask required for the complementary logic chain. Consequently, as soon as the chip is tested, the mask problem will surface and the manufacturing error can be corrected.

The use of complementary duplicate logic instead of duplicate functional logic also will almost always bring to light internal contamination problems such as bringing faults. This situation is illustrated in the showing of FIG. 4 of the drawings in which a functional register 50 and a duplicate complementary register 51 are respectively parts of the functional logic chain 11 and the duplicate complementary logic chain 12' shown in FIG. 3. Should a bridging fault occur within the chip during manufacture, such as that shown by the short circuit conductor 52 bridging between the same logic points in the two logic chains, then in the case illustrated in which a signal A should appear at the input to that functional register 50 and its complement $\bar{A}$ should appear at the input to complementary register 51, it is evident that the same signal will appear at both points due to the short circuit. It matters not which signal prevails, the complementary logic has been destroyed at that point and a subsequent comparison will detect the error. If however, instead of using duplicate complementary logic, duplicate functional logic had been used, then an error which had previously occurred in one side of the processing chain would not be detected because prior to comparison identical signal conditions would be reestablished in both chains so that upon comparison there would be no error detected.

The timing or race problem occurs where there is a processing chain having several levels of logic in which the designer expects that a signal starting at a certain point will progress through those levels of logic in a certain length of time. As a function of this calculated length of time, other logic functions are designed having specific processing or delay times so that signals coming from different parts of the circuit arrive at proper times for processing together. In some cases the calculations are not exact for various reasons and the calculated length of processing time for one signal path is not exactly what it turns out to be in fact. Generally the logic will fail, but is may not fail all of the time. It may fail under certain conditions, as for example conditions of lower than usual temperature, or higher humidity, or a power surge, or any one of a number of other reasons. This particular type of fault may go undetected because of the sometimes transient nature of the fault.

The use of duplicate complementary logic instead of duplicate functional logic will in many cases catch these design problems because the design of the duplicate complementary logic may not involve a one-to-one correspondence element-for-element with the logic design on the functional logic chain. For that reason, there is a possibility that the timing in the duplicate complementary logic may be slightly different than that in the functional side. This forces the designer to examine the timing not only at the final output stage but also at intermediate points along the processing chain because it is known that logic comparisons are going to be made at these intermediate points.

An illustrative example of the error checking system previously described is shown in the logic diagram of FIG. 5 in which portions of the functional logic chain 11 and duplicate complementary logic chain 12' are illustrated, together with a pair of comparators which sample the signal state within the two logic chains at selected points to monitor the occurrence of errors. The input signals to the functional logic 11 of the logic diagram of FIG. 5 are designated as X, Y and Z as data inputs, together with $\phi 1$, $\phi 2$, $\phi 3$ and $\phi 4$ as clock phase inputs. The complements of these signals designated as $\bar{X}$, $\bar{Y}$, $\bar{Z}$, $\bar{\phi}1$, $\bar{\phi}2$, $\bar{\phi}3$ and $\bar{\phi}4$ are shown at the right-hand side of the diagram as the signal inputs to the duplicate complementary logic 12'. These complementary signals can be obtained in the chip by the use of inverters 53 shown in FIG. 3, or can be obtained by the use of alternative forms of logic. All of these signals can also be considered to be signals which are not appearing at the input circuits of the chips but are signals which are appearing at some intermediate logic level along the chains 11 and 12. Similarly, the output signals N9 and N10 could be either signals appearing in the logic chain at some intermediate point, or could be the output signals appearing on lines 39 of FIG. 1.

Figure 6:
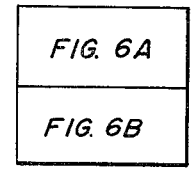
FIG. 6 is a timing waveform diagram for the logic diagram of FIG. 4 illustrating several normal operational modes and two possible failure modes.

The waveforms of signals appearing at different points along the logic of FIG. 5 have been designated as N1 through N16, and all of these signal waveforms together with the data and clock pulse input signals are shown in the timing diagram of FIG. 6. FIG. 6 is divided into four sections designated as A, B, C and D reading from left to right. Section A illustrates a normal operation of the processing through the logic of FIG. 5 with the signal states being initiated by an X or Y input signal. Section B illustrates a normal operation of the logic of FIG. 5 with processing initiated by a Z signal. Section C illustrates a failure mode in the processing chain which is initiated by a signal X or Y, and section D illustrates a failure mode in the processing chain initiated by a Z signal. The illustrated failure modes are of course only two of a large number which might be experienced. Each of the illustrated conditions A, B. C and D is shown for one complete clock phase cycle, that is, for a time interval encompassing clock pulse phases $\phi 1$ through $\phi 4$.

Referring now to FIG. 5, it is seen that the X and Y data input lines are inputs to an exclusive OR gate 60, while the complementary X and Y signal inputs $\bar{X}$ and $\bar{Y}$ are the inputs to exclusive NOR gate 61. The output of gate 60 is routed to the set input of D flip-flop 62 and appears as the N1 signal on the timing diagram of FIG. 6, whereas the output of gate 61 in the complementary logic is routed to the set input of D flip-flop 63 and appears as timing waveform N2. The set output of D flip-flop 62 is the N3 timing diagram waveform and is routed as one input to NOR gate 64 and also as an input to comparator 65, the reset output of D flip-flop 62 being also routed to comparator 65 and appearing as the N4 timing diagram waveform. The set output of D flip-flop 63 is sent to one input of NOR gate 66 as the N5 timing waveform and is also routed to an input to comparator 65, while the reset output of D flip-flop 63 appears as the timing waveform N6 and is routed to another input of comparator 65. The other inputs to NOR gates 64 and 66 respectively are the Z and $\bar{Z}$ signals.

The output from NOR gate 64 appears as one input to NAND gate 67, the other input of which is the $\phi 3$ clock pulse after inversion through inverter 68. The output of NOR gate 66 is one input to NAND gate 69, the other input of which is the $\bar{\phi}3$ signal inverted through inverter 70. The outputs of NAND gates 67 and 69 respectively are the N7 and N8 timing waveforms which respectively are routed to S/R flip-flops 71 and 72 as the set inputs thereto, the reset inputs being respectively the $\phi 1$ and $\bar{\phi}1$ cock pulses. The set output of S/R flip-flop 71 is the N9 timing waveform and is also presented as one input to comparator 73 while the reset output of S/R flip-flop 71 is the timing waveform N10 and is also presented as an input to comparator 73. The set and reset outputs of S/R flip-flop 72 are the timing waveforms N11 and N12 which are routed to comparator 73. The output signals from comparator 73 appear as the N13 and N14 timing waveforms, whereas the output signals from comparator 65 appear as the N15 and N16 timing waveforms.

The normal operation of the circuit as shown in the timing diagram section A shows an X signal arising at approximately the end of $\phi 1$ clock time, and passing through gate 60 as an N1 signal input to flip-flop 62.

Since flip-flop 62 has an enable input to which the φ2 clock pulse is applied, it does not react to the N1 signal until the φ2 clock arrives, at which time the flip-flop is set and the N3 signal arises, N3 going high and N4 the reset output going low. While this was transpiring, the complementary functions were taking place in the duplicate complementary logic side wherein the $\overline{X}$ signal which went low when the X signal went high appears as a low N2 output from gate 61 which sets flip-flop 63 when the φ2 clock pulse arrives, thereby driving the set output of flip-flop 63 to the low state as signal N5 and causing the reset output N6 to go high. The N3 through N6 signals all appear as inputs to the comparator 65, causing the comparator outputs N15 and N16 to be respectively high and low, which signal state is an indicator of a no error state. When the N15 and N16 signal states are examined by the error multiplexing and encoding logic there will be an interpretation of no error.

The high N3 signal passes through NOR gate 64 and is presented as a low signal to one input of the NAND gate 67, no output from gate 64 occurs until clock pulse φ3 arrives, passes through inverter 68 as a low and gates though as the N7 pulse. The same things occur in the complementary logic to generate the N8 pulse. The N7 pulse immediately sets flip-flop 71 and generates the N9 set output as a high, whereas the N8 pulse immediately sets flip-flop 72 and generates the N11 signal as a low. When N9 goes high, N10 of course goes low, and similarly when N11 goes low N12 goes high. The N9 through N12 signals presented to comparator 73 are exactly comparable in signal levels to the N3 through N6 signals which had been presented to comparator 65, and the output from comparator 73 shown as the N13 and N14 waveforms are the same as the N15 and N16 waveforms which had previously been described for comparator 65. Accordingly, again no error signal will be generated. A similar signal trace through can be readily made for the Z signal initiated normal operation shown in section B of the timing diagram.

Considering now the failure mode illustrated in section C of the timing diagram, it is observed that this is again an X signal initiated condition. It is however observed that upon the arising of the X signal, no N1 signal appears at the output of gate 60, a functional fault in the gate structure. However, it should be observed that at φ4 clock time when a Y signal arises at gate 60, the N1 signal does appear at the output of the gate. Accordingly, the gate failure during the X signal time was a transient condition. The failure of the N1 signal to arise during X signal time prevents the setting of flip-flop 62 by the φ2 clock pulse so that the N3 signal remains low and the N4 signal remains high. However, since no comparable failure occurred in gate 61 of the complementary logic, the N2 signal did appear and flip-flop 63 was set low. The input signals to the comparator 65 now differ considerably from those shown for normal condition A previously described.

While the state of the N5 and N6 signals are the same in both condition A and condition C, the state of the N3 and N4 signals are exactly reversed. This causes the N15 and N16 signals to shift from a high/low condition to a low/high condition indicating the occurrence of an error. This error is detected at φ3 clock pulse time and is shown as E 1 on the timing diagram. The erroneous N3 low signal state is presented to NAND gate 67 as a high which will not enable the low φ3 clock pulse to be gated through as the necessary high N7 pulse. Consequently, flip-flop 71 is not set and the signal states of N9 and N10 are respectively low and high instead of high and low. This miscompares with the N11 and N12 signal states which are what they should be, causing the N13 and N14 signals to be respectively low and high and indicating an error which shows up at φ4 clock pulse time as E 2.

Figure 7:
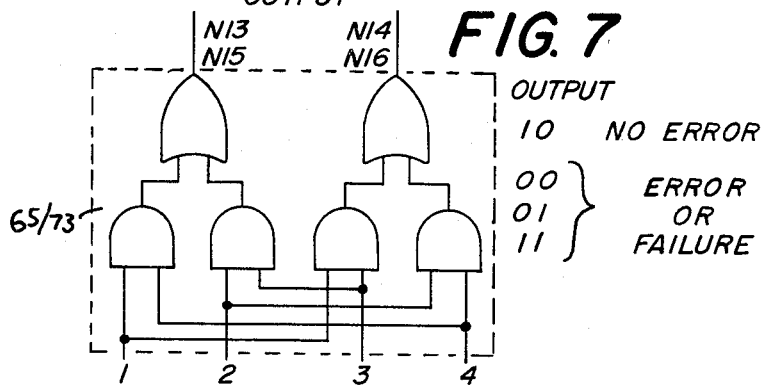
FIG. 7 illustrates one possible type of comparator utilizable in the logic diagram of FIG. 5.

Section D of the timing waveform diagram FIG. 6 shows an error in the duplicate complementary logic inverters circuit which results in the non-generation of a $\overline{\phi}1$ clock pulse even though there is present a φ1 clock pulse. Observation of the logic diagram of FIG. 5 shows that the φ1 and $\overline{\phi}1$ clock pulses do not enter the circuitry at a point sufficiently early to effect an error comparison at comparator 65, so that an E 1 signal will not be generated. However, the φ1 and $\overline{\phi}1$ clock pulses do enter the logic at flip-flops 71 and 72 so that the missing $\overline{\phi}1$ clock pulses will be detected as an error by comparator 73. This is illustrated as E 2 in section D of the FIG. 6 timing waveform diagram. One form of comparator suitable for use as comparators 65 and 73 is shown in the logic diagram of FIG. 7.

It will be appreciated that the present invention is subject to various modifications and changes which may be made from time to time without departing from the essential spirit or general principles of the invention, and accordingly it is intended to claim the same broadly as well as specifically as indicated by the appended claims.

What is claimed to be new and useful is:

1. An integrated circuit chip comprising in combination,
   (a) a first data processing chain having an input circuit and a first plurality of output circuits spaced at different points along said first data processing chain, at least one of said first plurality of output circuits being an intermediate output circuit,
   (b) a second data processing chain having an input circuit and a second plurality of output circuits spaced at different points along said second data processing chain, at least one of said second plurality of output circuits being an intermediate output circuit,
   (c) input signal connections for coupling external signals to said chip,
   (d) means connecting at least some of said input signal connections to said input circuits of both of said first and second data processing chains,
   (e) at least one comparator circuit having a first input circuit permanently coupled to said at least one intermediate output circuit of said first processing chain for receiving signals therefrom, a second input circuit permanently coupled to said at least one intermediate output circuit of said second processing chain for receiving signals therefrom, and an output circuit,
said at least one intermediate output circuit points of said data processing chains being the equivalent to each other along the processing path in each chain, and said comparator producing at its output circuit a first signal indicating the occurrence of an error when the input signals to the said comparator represent different data and producing at its output circuit a second signal when the input signals to the said comparator represent the same data.

2. An integrated circuit chip as defined in claim 1 further including at least another comparator circuit having a first input circuit permanently coupled to another of said first plurality of output circuits of said first processing chain for receiving signals therefrom, a second input circuit permanently coupled to another of said second plurality of output circuits of said second processing chain for receiving signals therefrom, and an output circuit, said at least another comparator circuit producing at its output circuit a first signal indicating the occurrence of an error when the input signals to the said comparator represent different data and producing at its output circuit a second signal when the input signals to the said comparator represent the same data, both of said at least one comparator circuit and said at least another comparator circuit functioning simultaneously.

3. An integrated circuit chip as defined in claim 1 wherein one of said first plurality of output circuits is the final output circuit of said first data processing chain, and wherein one of said second plurality of output circuits is the final output circuit of said second data processing chain.

4. An integrated circuit chip comprising in combination,
  (a) a first data processing chain having an input circuit and a first plurality of output circuits spaced at different points along said first data processing chain, at least one of said first plurality of output circuits being an intermediate output circuit,
  (b) a second data processing chain having an input circuit and a second plurality of output circuits spaced at different points along said second data processing chain, at least one of said second plurality of output circuits being an intermediate output circuit,
  (c) input signal connections for coupling external signals to said chip,
  (d) means connecting at least some of said input signal connections to said input circuits of both of said first and second data processing chains,
  (e) at least one comparator circuit having a first input circuit coupled to said at least one intermediate output circuit of said first processing chain for receiving signals therefrom, a second input circuit coupled to said at least one intermediate output circuit of said second processing chain for receiving signals therefrom, and an output circuit, said at least one intermediate output circuit points of said data processing chains being the equivalent to each other along the processing path in each chain, and said comparator producing at its output circuit a first signal indicating the occurrence of an error when the input signals to the said comparator represent different data and producing at its output circuit a second signal when the input signals to the said comparator represent the same data,
  (f) at least another comparator circuit having, a first input circuit coupled to another of said first plurality of output circuits of said first processing chain for receiving signals therefrom, a second input circuit coupled to another of said second plurality of output circuits of said second chain for receiving signals therefrom, and an output circuit, said at least another comparator circuit producing at its output circuit a first signal indicating the occurrence of an error when the input signals to the said another comparator represent different data and producing at its output circuit a second signal when the input signals to the said another comparator represent the same data,
  (g) an error encoding circuit having a plurality of input circuits and an output circuit, the output circuits of said at least one comparator circuit and said at least another comparator circuit being coupled to separate ones of said plurality of input circuits of said error encoding circuit, and said error encoding circuit being effective responsive to receipt of said first and second signals from said comparator circuits to generate at its output circuit encoded signals designating the sources of processing errors in said integrated circuit chip.

5. An integrated circuit chip as defined in claims 1, 2, 3 or 4 wherein said chip is a VLSI.

6. An integrated circuit chip as defined in claim 3 wherein said chip further includes at least one fault detector circuit having input circuits and an output circuit, said input circuits being coupled to selected ones of said input signal connections for coupling external signals to said chip, and said output circuit being coupled to one of said plurality of input circuits of said error encoding circuit, said at least one fault detector being operative to monitor and check for occurrence of errors in input signals to said chip which have not been processed through said data processing chains.

7. A plurality of integrated circuit chips as defined in claim 4 in which each said chip is an independent part of a total complex, said total complex also comprising,
  (a) an error handling integrated circuit chip as defined in claim 6,
  (b) interconnection means connecting the error encoding circuit output circuit of each of said plurality of integrated circuit chips as defined in claim 3 to the input circuit of said error handling chip,
  (c) interconnection means conducting power, data signals and timing signals to said plurality of integrated circuit chips,
whereby, said error handling chip processes said encoded error signals and is effective responsive to the received encoded error signals to generate at its final output circuit final encoded signals designating the sources of errors with respect to specific ones of said plurality of integrated circuit chips, and with respect to specific ones of said interconnection means, and with respect to said sources of power, timing signals and data signals.

8. A plurality of integrated circuit chips as defined in claim 6 in which each said chip is an independent part of a total complex, said total complex also comprising,
  (a) an error handling integrated circuit chip as defined in claim 6,
  (b) interconnection means connecting the error encoding circuit output circuit of each of said plurality of integrated circuit chips as defined in claim 6 to the input circuit of said error handling chip,
  (c) interconnection means conducting power, data signals and timing signals to said plurality of integrated circuit chips,
whereby, said error handling chip processes said encoded error signals and is effective responsive to the received encoded error signals to generate at its final output circuit final encoded signals designating the sources of errors with respect to specific ones of said plurality of integrated circuit chips, and with respect to specific ones of said interconnection means, and with respect to said sources of power, timing signals and data signals.

9. A plurality of integrated circuit chips as defined in claim 4 in which each said chip is an independent part of a total complex, said total complex also comprising,
   (a) an error handling integrated circuit chip as defined in claim 3,
   (b) interconnection means connecting the error encoding circuit output circuit of each of said plurality of integrated circuit chips as defined in claim 3 to the input circuit of said error handling chip,
   (c) interconnection means conducting power, data signals and timing signals to said plurality of integrated circuit chips, whereby, said error handling chip processes said encoded error signals and is effective responsive to the received encoded error signals to generate at an output circuit final encoded signals designating the sources of errors with respect to specific ones of said plurality of integrated circuit chips, and with respect to specific ones of said interconnection means, and with respect to said sources of power, timing signals and data signals.

10. A plurality of integrated circuit chips as defined in claim 6 in which each said chip is an independent part of a total complex, said total complex also comprising,
   (a) an error handling integrated circuit chip as defined in claim 4,
   (b) interconnection means connecting the error encoding circuit output circuit of each of said plurality of integrated circuit chips as defined in claim 6 to the input circuit of said error handling chip,
   (c) interconnecting means conducting power, data signals and timing signals to said plurality of integrated circuit chips, whereby, said error handling chip processes said encoded error signals and is effective responsive to the received encoded error signals to generate at an output circuit final encoded signals designating the sources of errors with respect to specific ones of said plurality of integrated circuit chips, and with respect to specific ones of said interconnection means, and with respect to said sources of power, timing signals and data signals.

11. Integrated circuit chips as defined in any of claims 1, 4, 6, 7, 8, 9 or 10 wherein the functional logic of said second data processing chain is a duplicate of the functional logic of said first data processing chain.

12. Integrated circuit chips as defined in any of claims 1, 4, 6, 7, 8, 9 or 10 wherein the functional logic of said second data processing chain is the duplicate complementary logic to the functional logic of said first data processing chain.

13. An integrated circuit chip as defined in claim 1, 2, 3, or 4 wherein said chip is a VLSI, and wherein the functional logic of said second data processing chain is a duplicate of the functional logic of said first data processing chain.

14. An integrated circuit chip as defined in claim 1, 2, 3, or 4 wherein said chip is VLSI, and wherein the functional logic of said second data processing chain is the duplicate complementary logic to the functional logic of said first data processing chain.

* * * * *